UNITED STATES PATENT OFFICE.

NATHANIEL THURLOW, OF NIAGARA FALLS, NEW YORK, ASSIGNOR TO THE PORTCHESTER CHEMICAL COMPANY, OF PORT CHESTER, NEW YORK, A CORPORATION OF NEW YORK.

DERIVATIVE OF PINENE AND PROCESS OF MAKING SAME.

No. 833,095. Specification of Letters Patent. Patented Oct. 9, 1906.

Original application filed December 11, 1901, Serial No. 85,425. Divided and this application filed August 5, 1902. Serial No. 118,432.

*To all whom it may concern:*

Be it known that I, NATHANIEL THURLOW, a citizen of the United States, residing at Niagara Falls, in the county of Niagara and State of New York, have invented new and useful Improvements in Derivatives of Pinene and Processes for Producing the Same, of which the following is a specification.

This invention relates to a process for producing pinyl oxalate and compounds containing the same.

In Patent No. 698,761, of April 29, 1902, and No. 726,873, of April 28, 1903, I have disclosed a process of making camphor and a process of making dipentene, respectively.

The invention described in the present application relates to the same subject-matter disclosed in my patent and former specification above referred to.

To carry out the present invention, I proceed in the manner described in the said patents, viz: I treat turpentine with oxalic acid and obtain thereby a complex oily mass, from which by suitable distillation I obtain pinyl oxalate.

The following is a detailed description of my invention: Three hundred and fifty pounds of rectified and dehydrated turpentine are heated with about seventy pounds of anhydrous oxalic acid to a temperature of about 120° centigrade or, preferably, to a somewhat lower temperature. When the reaction ceases, the resulting oily product contains about two hundred pounds of dipentene, about six per cent. of pinyl formate, about three per cent. of pinyl oxalate, and the remainder consists of free camphor, borneol oxalate and formate, and the higher polymerization products of pinene, with more or less free acid. The next step of the process is to wash the mass with water to remove this free acid. The resultant complex oil may be stored and sold in that condition and serve as a basis for the production of the other products. The specific gravity of this oil is about .902, and it boils at 185° centigrade. The resultant oily mass is then distilled at a low temperature and pressure, (78°–82° centigrade and vacuum of one-half atmosphere.) By successive distillations in this manner there is obtained as a residue an oily liquid containing pinyl oxalate, pinyl formate, together with polyterpenes and borneol formate. This residue is then distilled in a current of steam until eighty-five per cent. has been distilled. A colorless oil is thus obtained which becomes brownish on exposure to the air. The odor is harsh and unpleasant. This oil has a specific gravity at 20° centigrade of .930–.935. At 160° centigrade it begins to boil or decompose, and ninety per cent. distils over below 200° centigrade. After boiling for some time it solidifies on cooling, owing to separation of borneol. The gaseous products of decomposition are carbon monoxid, carbon dioxid, water, and some formic acid.

The following are the characteristics of pinyl oxalate, $C_{10}H_{16}(COOH_2)$: Very likely solid at ordinary temperature; boiling-point about 157° to 160° at six hundred and eighty millimeters vacuum; very unstable; breaks up on boiling with water into oxalic acid and a mixture of hydrocarbon; breaks upon heating into camphor, carbon monoxid, and water. Its formula is as fololws:

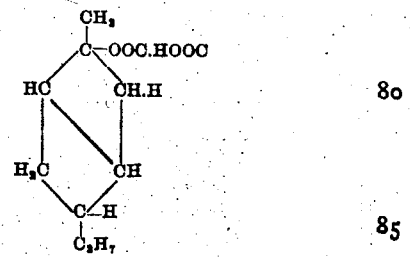

Having thus described my invention, the following is what I claim as new therein and desire to secure by Letters Patent:

1. The process of producing pinyl oxalate which consists in treating turpentine with oxalic acid under the influence of heat, distilling the resulting mass, and collecting the residue after distillation.

2. The process of producing pinyl oxalate which consists in treating turpentine with oxalic acid under the influence of heat at a temperature below 120° centigrade, distilling the resulting mass, and collecting the residue after distillation.

3. The process of producing pinyl oxalate which consists in treating turpentine with oxalic acid under the influence of heat, at a temperature below 120° centigrade, distilling the resulting mass at a temperature of from 78°–82° centigrade and vacuum of one-half atmosphere, and collecting the residue.

4. The process of producing pinyl oxalate which consists in treating turpentine with oxalic acid under the influence of heat, distilling the resulting mass, and collecting the residue after distillation, distilling said residue and collecting the distillate.

5. The process of producing pinyl oxalate which consists in treating turpentine with oxalic acid under the influence of heat, distilling the resulting mass, and collecting the residue after distillation, distilling said residue in a current of steam until eighty-five per cent. to ninety per cent. thereof comes over, collecting said distillate.

6. The process of producing pinyl oxalate which consists in treating turpentine with oxalic acid under the influence of heat, at a temperature below 120° centigrade, distilling the resulting mass at a temperature of from 78°–82° centigrade and vacuum of one-half atmosphere, collecting the residue, distilling said residue in a current of steam until eighty-five per cent. to ninety per cent. thereof comes over, and collecting said distillate.

7. The herein-described oily mass containing pinyl oxalate having a harsh unpleasant odor and becoming brownish on exposure to air, a specific gravity of .930 to .935 at 20° centigrade.

8. The substance pinyl oxalate, produced by the action of oxalic acid on turpentine and having the formula: $C_{10}H_{16}(COOH_2)$; said compound having a boiling-point of about 157° to 160° at six hundred and eighty millimeters vacuum, breaking up on heating into camphor, carbon monoxid and water, and on heating with water into oxalic acid and hydrocarbons.

NATHANIEL THURLOW.

Witnesses:
 LEWIS E. SAUNDERS,
 ARTHUR G. BACHMAN.